US007076804B2

(12) United States Patent
Kershenbaum et al.

(10) Patent No.: US 7,076,804 B2
(45) Date of Patent: Jul. 11, 2006

(54) AUTOMATED PROGRAM RESOURCE IDENTIFICATION AND ASSOCIATION

(75) Inventors: Aaron Kershenbaum, New City, NY (US); Lawrence Koved, Pleasantville, NY (US); Marco Pistoia, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 833 days.

(21) Appl. No.: 09/854,031

(22) Filed: May 11, 2001

(65) Prior Publication Data

US 2002/0184486 A1 Dec. 5, 2002

(51) Int. Cl.
*G06F 17/30* (2006.01)

(52) U.S. Cl. .............................. 726/30; 726/22; 726/26; 726/27; 713/167

(58) Field of Classification Search ................ 717/154; 713/167, 200, 201, 154; 726/22, 26, 30
See application file for complete search history.

(56) References Cited

U.S. PATENT DOCUMENTS

| 5,313,616 | A | * | 5/1994 | Cline et al. | 717/127 |
| 5,485,409 | A | * | 1/1996 | Gupta et al. | 726/25 |
| 5,915,085 | A | * | 6/1999 | Koved | 713/200 |
| 6,044,467 | A | * | 3/2000 | Gong | 713/200 |
| 6,047,377 | A | * | 4/2000 | Gong | 713/201 |
| 6,125,447 | A | * | 9/2000 | Gong | 713/201 |
| 6,138,238 | A | * | 10/2000 | Scheifler et al. | 713/200 |
| 6,192,476 | B1 | * | 2/2001 | Gong | 713/201 |
| 6,381,735 | B1 | * | 4/2002 | Hunt | 717/158 |
| 6,389,540 | B1 | * | 5/2002 | Scheifler et al. | 713/200 |

OTHER PUBLICATIONS

Nyanchama et al.; "The Role Graph Model and Conflict of Interest"; Feb. 1999; ACM Transactions on Information and System Security, vol. 2, No. 1; pp. 3-33.*
Schmidt, David; "Data Flow Analysis is Model Checking of Abstract Interpretations"; Jan. 1998; ACM Proceedings of the 25th ACM SIGPLAN-SIGACT symposium on Principles of programming languages; pp. 38-48.*
Gong, Li; "JAVA Security Architecture (JDK 1.2)"; Dec. 6, 1998; Sun Microsystems, Inc.; pp. 1-61.*
Gong et al.; "Implementing Protection Domains in the JAVA Development Kit 1.2"; 1998; JavaSoft, Sun Microsystems, Inc.; pp. 1-10.*

* cited by examiner

*Primary Examiner*—Kambiz Zand
*Assistant Examiner*—Jung Kim
(74) *Attorney, Agent, or Firm*—Ido Tuchman; Lisa M. Yamonaco

(57) ABSTRACT

This invention provides methods and apparatus for determining a set of authorization usage for collection of code. By using a program graph, the present invention identifies the code within in bounded paths in the program graph that use authorization. The level of precision is able to identify authorization usage to the level of basic blocks, methods, classes or other collections of code. By using the analysis technique described in this invention, we can determine the authorizations needed by collections code, including Java applets, servlets, and Enterprise JavaBeans. By using the present invention, it is possible, prior to loading the mobile code, to prompt the administrator or end-user to authorize or deny the code access to restricted the resources, or determine whether authorization testing will be required.

92 Claims, 8 Drawing Sheets

AUTOMATED PROGRAM RESOURCE IDENTIFICATION AND ASSOCIATION

FIELD OF THE INVENTION

This invention is directed to the field of computer security. It is more particularly directed to the detection of authorization usage for computer programs.

BACKGROUND OF THE INVENTION

Java 2 has a security architecture that is intended to protect client and server systems from malicious code that has been dynamically installed (e.g., mobile code). For example, applet code can be downloaded from the Internet into a Web browser, or uploaded via RMI into a server application. The Java 2 security system includes an authentication subsystem and an authorization subsystem. In the discussion that follows, we will concern ourselves only with the authorization subsystem.

Java 2 authorization is based on a set of ProtectionDomains, where each Java application class is loaded via a SecureClassLoader into the Java virtual machine. In the reference implementation of the Java virtual machine, classes part of the Java runtime are loaded from the "boot classpath", by a special class loader sometimes referred to as the "primordial class loader." These classes are considered fully trusted and are implicitly given AllPermission. Each application class refers to a ProtectionDomain. This ProtectionDomain object includes a CodeSource and a set of Permissions. The CodeSource is authentication information (the code base URL, and the digital certificates used to sign the code if the code was signed). The Permissions are a set of Permission objects representing the permissions, or rights, the code has with respect to privileged operations. It is the computation of this set of Permission objects that is the subject of this invention.

Prior to deploying (application or library) code in Java, an important question arises: "What Java Permission(s) are required to enable the code to run in a system which has the security authorization subsystem enabled?" Currently, this problem is solved empirically. The code writer reads the documentation for any libraries (including the Java runtime libraries) invoked by the code and determines whether any of these libraries requires that the code have specific Permission(s) in order to run. Unfortunately, this documentation is often missing information on used Permission(s), or the documentation is out of date. In the absence of reliable documentation, the developer runs the new code and waits until a SecurityException is thrown due to an insufficient set of Permission(s) allocated to the new code. The developer then adds any additional used Permission(s) to the set granted to the code under test. This trial-and-error process is repeated until no more SecurityException failures occur.

An analogous scenario can be depicted on the system where mobile code is dynamically installed. When mobile code is downloaded on a system, the system administrator (e.g., the web browser user) has to figure out what Permission(s) that code needs in order for it to work without causing SecurityException failures. The system administrator should therefore rely on what the code developer/distributor recommends, with the risk that too many Permission(s) are granted and security holes are opened. Alternatively, the system administrator should first run the code with no Permission(s), look at the SecurityExceptions thrown, and incrementally grant Permission(s) as is necessary. This process can be tedious and error-prone. In addition, insufficient code testing may result in a wrong set of Permission(s) being granted, which may cause security exposures or code instability.

Rather than relying on empirical, or ad hoc, methods of determining what Permission(s) are used to run application/library code, we describe a process by which the used Permission(s) for a software component (e.g., library, application, etc.) can be computed.

Java 2 Authorization Algorithm

When the Java 2 authorization subsystem is called, a test is made to determine whether all of the methods in the runtime stack are authorized to perform the privileged operation. Specifically, when a Java program is running, the Java virtual machine builds a call stack, with each element of the stack being an activation record that holds state information about a method that has been called during program execution. Each activation record holds a reference to the called method, as well as local variables, etc. From the referenced method, it is possible to determine the method's class. For Java 2 authorization, we are only concerned with the class whose method was called since permissions are associated with classes, not methods. The Java 2 authorization algorithm will test the classes' ProtectionDomains to see if they include a used Permission.

As previously noted, each application class loaded via a SecureClassLoader into the Java runtime is associated with a ProtectionDomain object. This object includes Permission object(s) indicating to which resources the class is authorized access. Classes loaded via the boot classpath are implicitly authorized for any privileged operation (the equivalent of AllPermission).

The Java 2 authorization algorithm is executed by calling AccessController.checkPermission(p), where p is a Permission object. The checkPermission( ) method obtains an AccessControlContext object, which is done by searching the current Java thread to find the activation records for all methods called in the current thread. For each activation record, the associated class for the activated method is identified, and the ProtectionDomain object for that class is obtained. This set of ProtectionDomains for the classes on the thread call stack is called an AccessControlContext. AccessController.checkPermission( ) determines whether Permission p, passed as an argument to the method, is included in each ProtectionDomain in the AccessControlContext. If not, a SecurityException is thrown by the checkpermission( ) method, indicating that authorization failed. If all ProtectionDomains in the AccessControlContext include the Permission p, then checkpermission( ) silently returns to its caller, indicating that the authorization was successful.

The basic authorization algorithm is modified in two significant ways: new threads inheriting an AccessControlContext and calls to AccessController.doPrivileged( ). When a new Java Thread is created, the parent thread creates an AccessControlContext and saves it in the child thread as the inherited AccessControlContext. The inherited AccessControlContext includes the set of ProtectionDomain objects from the classes associated with the activation records on the parent thread stack at the time the new (child) thread is created. Subsequently, the child thread call to checkpermission( ) proceeds as before, but also does an authorization test against the thread's inherited AccessControlContext (if any). That is, all of the ProtectionDomains in the inherited AccessControlContext will also be tested to see if they include Permission p. This extra test is done to prevent a child thread from having permissions which are greater than those of the parent thread. If this test were not performed, creating new threads would constitute an easy way to bypass authorization constraints of the parent thread.

When a thread calls AccessControlContext.doPrivileged( ), a mark is nominally left on the thread's stack at the activation record for the method that called dopriviledged( ). When the same thread subsequently needs an AccessControlContext (e.g., to call checkpermission( ) or for a new Thread), the AccessControlContext that is created only includes ProtectionDomains associated with activation records between, and including, the currently executing method and the activation record for the method that includes the dopriviledged( ) mark. From a practical perspective, this effectively limits the number of classes requiring the Permission on subsequent calls to checkpermission( ). There are variants of AccessControlContext.doPrivileged( ) which accept an AccessControlContext instance as an argument. As before, a call to checkpermission( ) will build an AccessControlContext as previously described, but it will also include all ProtectionDomains included in the AccessControlContext passed as an argument to the doPrivileged( ) call. The effect is to further constrain authorization by requiring additional ProtectionDomains to pass the authorization test.

Lastly, many security authorization tests in Java 2 are made through calls to methods in the SecurityManager class. In the reference implementation of this class, most of the authorization tests are made by calling AccessController.checkPermission( ) with an appropriate Permission object. Additional security policy decisions are implemented by the SecurityManager, but analysis of these policies is outside the scope of this invention. It would also be advantageous to identify the set of authorizations used by a collection of code.

SUMMARY OF THE INVENTION

It is therefore an aspect of the present invention to provide methods and apparatus to identify the set of authorizations used by a code collection. To achieve this, we identify paths in a program graph that lead to a node identifying the authorization. We also identify, using a data flow analysis, any necessary parameters passed to methods requesting the authorization. We also traverse the program graph to identify relationships between code collections, for example, thread allocations and thread invocations in programs, to identify additional program paths resulting in authorization tests. Additionally, we aggregate code collections, for example, methods within classes in Java programs, and their associated authorizations, in order to associate associations with the larger, aggregated code collections. Other objects and a better understanding of the invention may be realized by referring to the detailed description.

BRIEF DESCRIPTION OF THE DRAWINGS

These and other aspects, features, and advantages of the present invention will become apparent upon further consideration of the following detailed description of the invention when read in conjunction with the drawing figures, in which:

As shown in FIG. 2,

DESCRIPTION OF THE INVENTION

Figure 1:
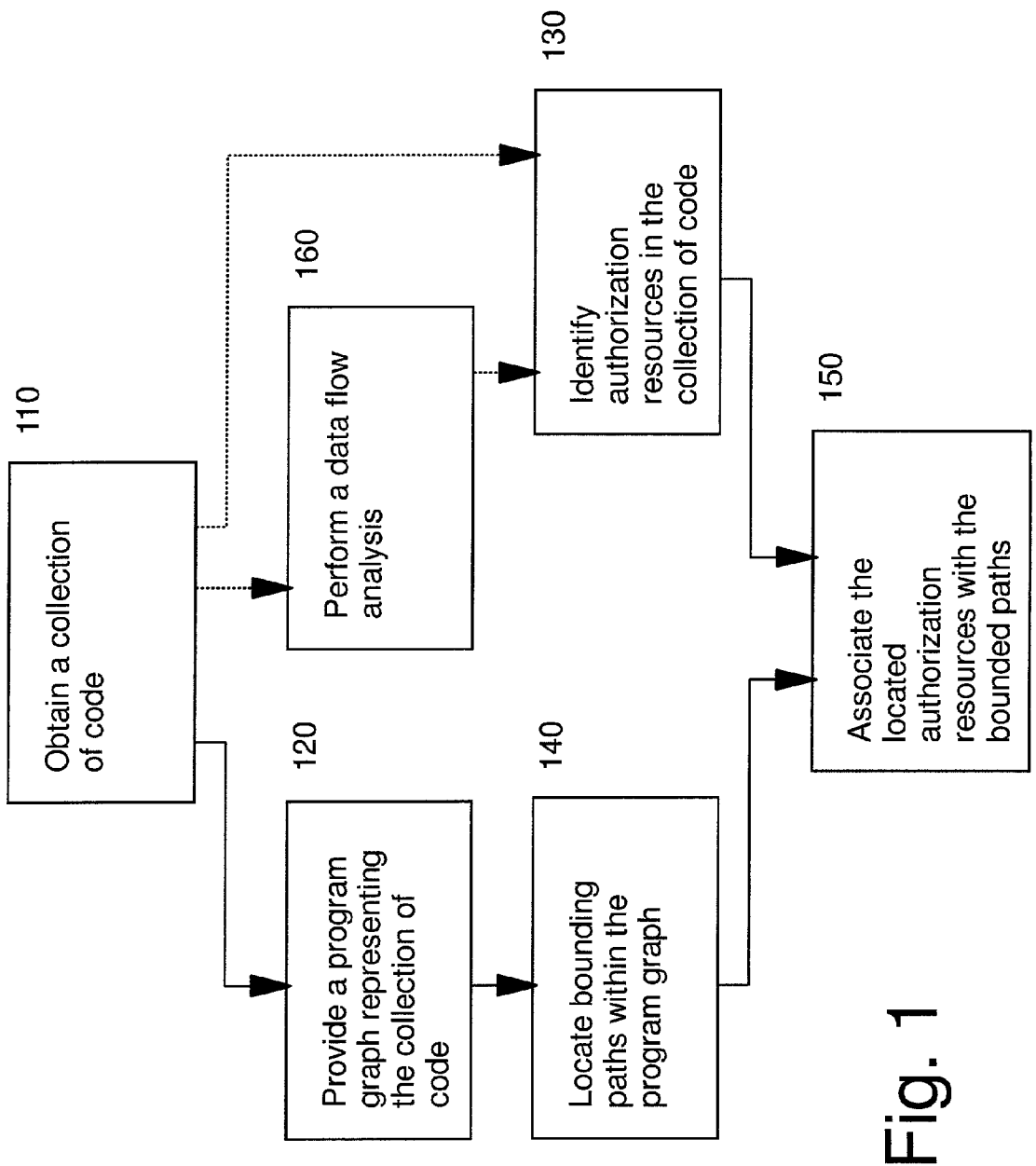
FIG. 1 shows an example of an embodiment of a method employing a computer in accordance with the present invention.

The present invention provides methods and apparatus for identifying the set of permissions used by an application class. To achieve this, we identify paths in a program graph that lead to a node whose method is an authorization test. In Java 2, this method includes AccessController.checkPermission( ). We also identify any authorization object p that is passed as an argument to this method. In an advantageous embodiment of this invention the program graph is an invocation graph. Since Java 2 authorization is based on associating ProtectionDomains with classes (not methods), a path-insensitive program graph construction algorithm is sufficient. That is, all intra-procedural instruction paths through each method are included in the program graph. In addition, a data flow analysis is performed. In the context of Java 2, the data flow analysis is used to identify the java.security.Permission object p that is passed as an argument to the java.security.AccessController.checkPermission( ) method. Except as noted below, each class in a path from a root node in the program graph to a node for the AccessController.checkPermission(p) method uses Permission p. It should be noted that even though the description of the present invention uses the terminology of object oriented programming, the present invention also can be applied to non-object oriented languages and environments.

Call Graph Construction and Characteristics

In the advantageous embodiment, we employ a program graph that is path-insensitive flow-sensitive context-sensitive invocation graph. By path-insensitive we mean that all possible instruction execution paths within each method are included in the program graph. The program graph is flow-sensitive since we consider the order of execution of the instructions in each method, accounting for local variable "kills" and casting of object references. By context-sensitive we mean that for each call site in a method, we identify the set of receivers, target methods and parameters. Each node in the program graph includes this context, or state information. This context is used in identifying a call site's successor node in the program graph.

In addition, an advantageous embodiment of this invention includes a data flow analysis based on the program graph. This data flow analysis is used to propagate object allocation sites and string constants through the program graph. In some embodiments it is sufficient to only propagate a limited number of allocation sites, including Permission, and Thread objects, including all of their subtypes, as well as string constants. In a specific embodiment, , there is primary interest in string constants used as parameters to Permission (or subtype) object constructors. These Permission (or subtype) objects are subsequently passed to AccessController.checkPermission( ) calls. As a practical matter, most parameters to Permission (and their subtype) constructors are string constants. In a few cases the parameter value is the result of a computation (e.g., string concatenations). A more sophisticated data flow analysis is used in such circumstances.

For a "closed-world" analysis (e.g., the analysis of a whole program) the root nodes of the graph are the entry points to the program. As an example, the root node for a stand-alone Java program has a method signature of static void main(String[]). For applets, servlets, etc., multiple entry points are considered as root nodes. For "open-world" analysis, each of the methods accessible to applications using the library (e.g., public and protected methods) is included as a root node in the graph.

An advantageous embodiment of the current invention employs a program graph with the following characteristics. It is an invocation graph, where each node in the program graph represents a method invocation. Each node in the graph includes the following context state:

The target method.
For instance methods, the type or allocation site of the method's receiver. The receiver may include more detailed information, such as a string constant or memory allocation site for the receiver. For static methods, there is no receiver.
All parameters to the method, represented as a vector of sets of possible allocation sites (or types) or constants. As with the receiver, it may include more detailed information.
A set of possible return value allocation sites, constants or types from this method. As with the receiver, it may include more detailed information.

The edges in the call graph represent call sites in methods to target methods. The edges in the graph are directed, where each edge points from a calling method (call site) to a target method. The graph may be cyclic. Also, each node in the graph is unique—its context (target method, receiver, parameters vector) is unique. That is, two nodes in the graph will not have the same context.

For simplicity of presentation, we assume bi-directional traversal of the program graph is possible, even though the edges in the graph are nominally unidirectional. That is, from a root node, we can traverse the entire program graph. Also, from any node within the program graph, we can find all of its predecessor nodes.

The Basic Automated Program Resource Identification and Association Algorithm The objective of the algorithm is to statically identify a set of authorizations used for each class being analyzed. Specifically, the algorithm identifies methods (and their declaring classes) in paths that pass through nodes representing calls to an authorization test. In Java 2 that authorization method is AccessController.checkPermission( ) or a call to some of the java.lang.SecurityManager authorization testing methods. Root nodes in the program graph are included in the set of start nodes. Also, in Java 2, any AccessController.doPrivileged( ) node's predecessor nodes are considered start nodes. A stop node is a node that is an authorization test. In Java 2 a stop node is a node whose target method is AccessController.checkPermission( ) or one of the SecurityManager authorization testing methods.

In an advantageous embodiment written for Java programs, the algorithm identifies all nodes in all paths bounded by any start node and a stop node and associates a java.security.Permission p (or an appropriate subtype) with each of the nodes in the path. The value of p is obtained by identifying the parameter p to the authorization test stop node. The object p is an allocation site obtained as a result of the data flow analysis We take all of the methods that are represented by the nodes in the paths, and identify the classes that declared the methods. Each such class is associated with Permission p.

The following example of pseudo-code embodies a basic algorithm of the present invention:

```
// Identify all start and stop nodes in the graph
// The start set includes all nodes in the call graph root set
Set start = new Set ( rootNodes );
// Initially, the stop set is empty
Set stop = new Set( );
// Identify additional start nodes and the stop nodes
// by iterating over all nodes in the call graph.
Iterator nodesIter = graphNodes.iterator ( );
while ( nodesIter.hasNext ( ) ) {
    Node node = nodesIter.next ( );
    if ( isDoPrivileged ( node ) {
        start.addAll ( node.getPredecessors ( ) );
        continue;
    }
    if (isCheckPermission( node ) ) {
        stop.add ( node );
        continue;
    }
}
// Find all nodes between stop to start nodes and get the used
// Permission. For each node, get its method and associated class.
// Associate the Permission with each class identified.
// For each checkPermission (perm) call, identify the Permission
// perm and the classes that need the Permission.
Iterator stopIter = stop.iterator ( );
while ( stopIter.hasNext ( ) ) {
    Node stopNode = stopIter.next ( );
    // Get the Permission from the checkPermission () node
    UsedPermission perm = getPermission ( stopNode );
    // Using a work list algorithm, find all nodes in all paths
    // that are bounded by the nodes in the start set and
    // the stop node. A work list algorithm is used since
    // the graph may be cyclic.
    Set nodes = getNodes ( stopNode, start );
    // For each such node, get the node's method and
    // the class that declared that method.
    // Add the Permission as being used for the class.
    Iterator nodesIter = nodes.iterator ( );
    while ( nodesIter.hasNext ( ) ) {
        Node node = nodesIter.next ( );
        Method method = node.getMethod ( );
        Class declaringClass = method.getDeclaringClass ( );
        // Remember that this class needs this Permission
        usedPerms.add ( declaringClass, perm );
    }
}
```

At the end of this algorithm, each class in the usedPerms map includes a set of Permissions used for the class.

Threads

When a Thread constructor is called, an AccessControlContext is instantiated and added to the new Thread instance as its inherited AccessControlContext. Subsequently, whenever the child Thread creates an AccessControlContext (e.g., during a call to checkpermission( ) or when a new Thread is created), the ProtectionDomains from the child Thread's inherited AccessControlContext's ProtectionDomains are included in the newly created AccessControlContext It should be noted that the creation of a new Thread does not result in the newly created Thread being started. In fact, the Thread could be started by a different Thread, or by a method in a class other than that which created the Thread. Nominally, the Thread.start( ) method calls the Thread.run( ) method. The run( ) method becomes the root (starting) method for the child Thread.

To correctly model a Thread, we should appropriately model its constructor and start( ) methods. We need to know which classes are included in a newly created Thread's inherited AccessControlContext. We can simplify the problem definition by rewriting the invocation graph to include a predecessor edge from a Thread.run( ) call site to the allocation site for the inherited AccessControlContext. The AccessControlContext allocation site is associated with the allocation site for the run( ) method's receiver (a Thread object). In general, an allocating method also calls an object's constructor.

To correctly model the inherited AccessControlContext allocation sites, we build a lookup table that maps Thread allocation sites to the graph nodes where the respective inherited AccessControlContext constructor is called. This mapping allows us create the new predecessor edge for the Thread.run( ) method.

The following pseudo-code embodies the basic algorithm.

```
// For all Thread allocation sites, build a table that
// maps the Thread to its inherited AccessControlContext
// constructor.
Map threadInheritedACCMap = new Map ( );
// Iterate over all of the object allocations, selecting
// Thread allocations. From the Thread allocation site, obtain
// the inherited AccessControlContext constructor node.
Iterator allocIter = allocationSites.iterator ( );
while ( allocIter.hasNext ( ) ) {
    AllocSite allocSite = allocIter.next ( );
    if ( allocSite.getClass ( ) == java.lang.Thread ) {
        AllocSite inheritedACC = allocSite.getInheritedACC ( );
        Node node = inheritedACC.getNode ( );
        threadInheritedACCMap.add ( allocSite, node );
    }
}
```

Now, when we reach a Thread.run( ) node in the invocation graph, we can find its predecessors by looking up the Thread allocation site's inherited AccessControlContext allocation site node and use it as the replacement predecessor edge.

From the algorithm above, the getNodes( ) method is suitably modified to use allocCallSites to find replacement predecessor nodes when searching the call graph.

doPrivileged with an AccessControlContext

In addition to the AccessController.doPrivileged( ) method described above that takes a PrivilegedAction argument, the other form of the doprivileged( ) method also takes an AccessControlContext instance as an argument. The behavior of this method is similar to the version of the doprivileged( ) that was previously described. However, in this case, when a AccessController.checkPermission( ) authorization test is performed, all of the ProtectionDomains in the AccessControlContext argument are also included in the authorization test.

To model this behavior, we want to include all of the classes that would be considered when the AccessControlContext was created. These classes will use the Permission p passed as an argument to AccessController.checkPermission( ). To do so, we add the node for the allocation site for the AccessControlContext as a predecessor of the doprivileged( ) call site. The getNodes( method in the algorithm will then correctly include all of the AccessControlContext nodes.

The precision of the invocation graph and data flow analysis affects the precision of the analysis as described by this invention. The compiler community commonly uses variants of one of several popular program graph construction techniques, such as Rapid Type Analysis (RTA) and Class Hierarchy Analysis (CHA). These algorithms are considered to be "conservative". When writing an optimizer for a compiler, being "conservative" will not lead to incorrect execution of the resulting program, though the optimized code may run as fast as it could. However, these algorithms generate paths in the program graph that do not exist in the actual program. A graph that is overly conservative will result in the allocation of Permissions to classes that do not use the Permissions, possibly opening security holes. This would violate the "principle of least privilege". Thus, it is desirable to employ a graph construction algorithm that minimizes its conservativeness.

To improve precision, an advantageous embodiment uses a program graph algorithm that is context-sensitive and flow sensitive. Other graph construction algorithms can be employed, such as those described above that are context-insensitive. However, people experienced in the art are aware that a context-sensitive call graph yields more precise results.

A flow sensitive graph construction technique considers the order of execution of instructions both intra and inter procedurally. A flow sensitive analysis improves the accuracy of the resulting program graph construction. An advantageous embodiment uses a program graph that is flow sensitive, including support for local field "kills"—local fields that are overridden by subsequent assignments to the same field—and type casting.

Path insensitive static analysis of programs does not consider input values or the values of constants defined within the program. All intra-procedural paths are considered during the analysis. For example, in the statement:

if (false) exp1 else exp2 both exp1 and exp2 are evaluated even though, in practice, exp1 may never get executed. While conservatively correct, this results in additional nodes being generated in the graph that may not occur in practice. The net effect is that all used Permissions are included, though some addition Permissions may be included that are not strictly necessary in practice. Adding path sensitivity would further reduce the conservativeness of the analysis.

In an advantageous embodiment, we define an allocation site to be the type of the object being allocated (e.g., the class), the method in which the memory is being allocated, and the instruction offset in that method. The problem that arises with this definition of an allocation site is that it does not directly map to a node in the invocation graph. A change to the definition of the allocation site that results in a one-to-one mapping will yield a more precise result.

In an advantageous embodiment of the present invention we are able to determine, for a given application or classes in a library, the set of Java authorizations for each class within the analysis scope. By using a context-sensitive flow-sensitive call graph, we are able to accurately identify the classes in each path that include a call to the Java 2 security authorization subsystem. The level of precision we attain is far greater than that used for Java 2 security since we are able to identify authorization use to the level of instructions, basic blocks and methods, rather then the coarser granularity of classes or ProtectionDomains (which may include many classes).

By using the analysis technique described in this invention, we can determine the Permissions needed by mobile code, such as applets, servlets, and Enterprise Java Beans. Prior to loading the code, it is possible to prompt the administrator or end-user to authorize or deny the code access to restricted resources protected by the authorization subsystem.

This ability, to be able to automate the process of determining which authorizations need to be granted to the application, changes the relationship between the developer of the code and the administrator/end-user. Instead of relying solely on recommendations from the developer, or resorting to trial-and-error testing of the code to determine required Permissions, a tool can analyze the code and make its own recommendations and/or validate recommendations made by the developer. This shifts the relationship from one that requires that the developer be trusted, to something that can be verified.

Java 2 allocates Permissions to classes. As a practical matter, Permissions are aggregated at the level of ProtectionDomains (e.g., at the JAR or file system directory level). This coarsens the granularity when assigning Permissions. Without the present invention, this level of granularity appears to be reasonable. The present invention allows identification of authorization usage down to a specific method. A refinement of the Java 2 authorization algorithm could result in the minimization of authorization, getting us closer to the application of the "principle of least privilege". In addition, anyone skilled in the art could apply the present invention to other languages, including but not limited to the Microsoft C# language, Including but not limited to procedural languages and functional languages. Thus in an example embodiment of the present invention, as is shown in FIG. 1, a method is provided including the steps of employing a computer for obtaining a collection of code {110}, providing a program graph representing the collection of code {120}, identifying authorization resources in the collection of code {130} locating bounded paths within the program graph {140} and associating the located authorization resources with the bounded paths {150}. When necessary, perform a data flow analysis (160) to help in the identification of the resource on which authorization testing is to be performed. The data flow is used to propagate constants and/or symbolic representations of the program graph which are used for identifying state information that could be passed to a authorization test. In its simplest form, a constant is passed as a parameter to an authorization test.

In some embodiments of the method, the collection of code includes codes obtained from a group of codes including basic blocks, class methods, classes, collections of classes, object code, or any combination of these; and/or the step of providing a program graph 120, includes constructing the program graph through static analysis techniques.

The identifying authorization resources may include finding at least one authorization point in the program graph, and/or a Java authorization point. Finding the Java authorization point may also include finding an AccessController.checkPermission node in the program graph, and finding a java.security.Permission object passed as an argument to the AccessController.checkPermission method.

In other embodiments, the authorization point is an instruction invocation. The instruction may be a call to an operating system or supervisor program, where the instruction (or a numeric constant parameter) indicates the resource being accessed. In still other embodiments, the instruction invocation is used in a particular language for the collection of code, which includes but is not limited to C, C++, and C#.

The step of identifying authorizations 130 may include employing data flow analysis. The data flow analysis is often used to propagate constants or symbolic references to values which further discriminate the resource for which authorization is being performed. In such cases, the process will need the set of possible values each variable, parameter or receiver could hold at various points in the program.

Identifying or locating any bounded path 140 may also include locating a set of start nodes and locating a stop node in the program graph. A bounded path includes all nodes within the graph bound by start nodes and a stop node.

The step of associating authorizations with the graph may also include associating and aggregating the any authorization resource with the collection of code. This step may include associating the authorization resource with the basic block, class method, method and/or collection of these forms of collection of code. The granularity of the aggregation varies depending on the need of the authorization system or system that uses the results of the algorithm described in the present invention.

Figure 2:
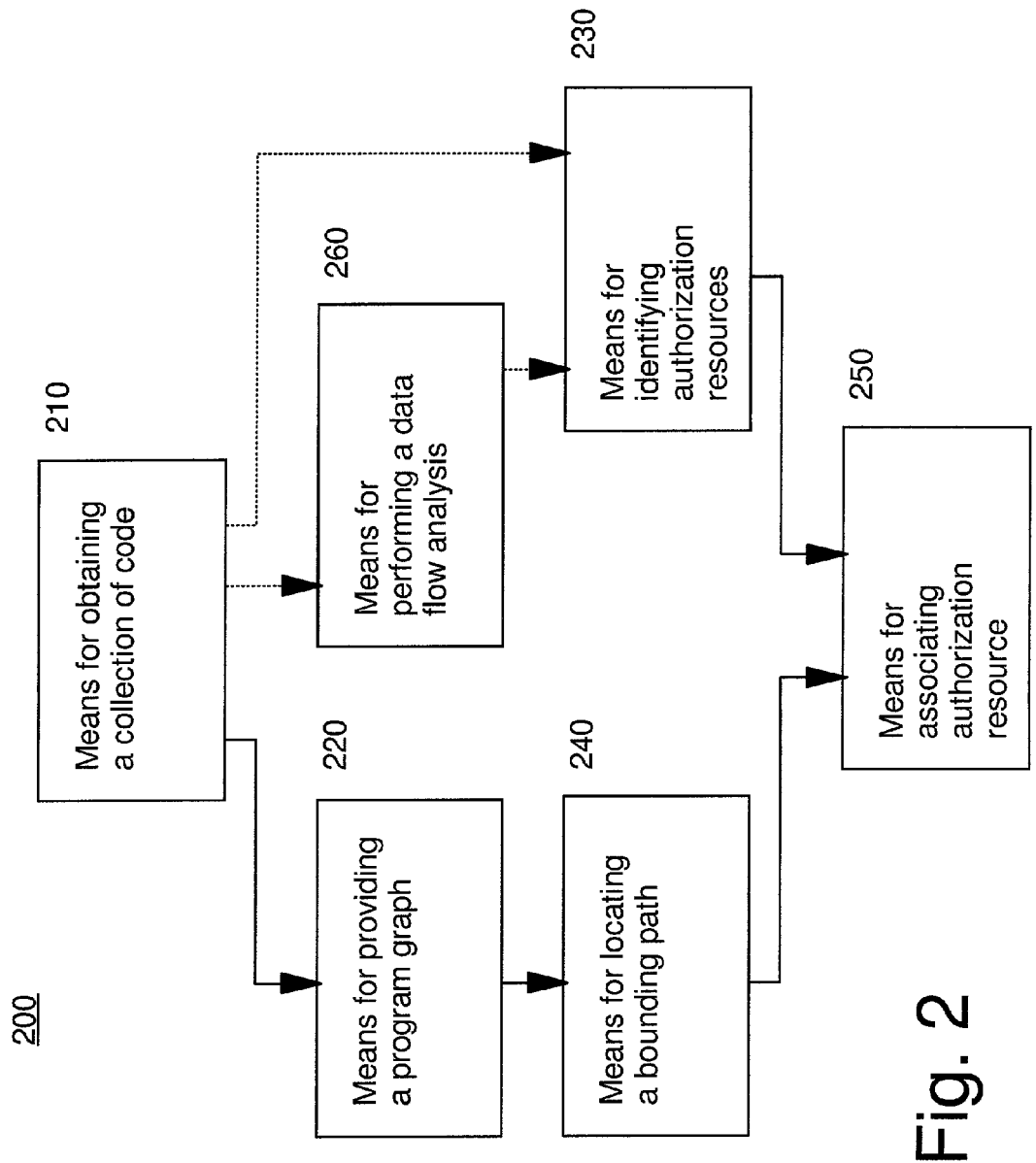
FIG. 2 shows an example of an embodiment of an apparatus of a computing means in accordance with the present invention.

In an example embodiment of the present invention, the invention includes an apparatus for a computing means 200 providing advantageous results. As shown in FIG. 2, the computing means 200, includes means for obtaining a collection of code (210), means for providing a program graph (220) representing the collection of code, means for identifying authorization resources (230) used by the collection of code, means for locating a bounded path (240) within the program graph, and means for associating an authorization resource (250) with the bounded path. The components of the computing means are generally collocated. In alternate embodiments the components are not collocated but are coupled to communicate and act together to perform the function of the apparatus.

In such an embodiment, the collection of code includes, but is not limited to, codes obtained from a group of codes including basic blocks, class methods, classes, collections of classes or any combination of these. The program graph from the collection of code can be obtained through static analysis techniques. The static analysis can be performed on object code, source code, an intermediate representation of the program, such as is generated by a compiler, or any other suitable form of the code, or any suitable combination thereof.

The means for finding an authorization resource includes locating at least one authorization point in the program graph. For example, when the program is written in Java, the program graph is searched for one of the Java authorization points—a call to AccessController.checkPermission( ) or one of the authorization test methods in the java.lang.SecurityManager class. In the case of calling AccessController.checkPermission( ), the means for performing data flow analysis (260) will propagate an object which represents the authorization resource. In Java, this object is assignment compatible with java.security.Permission, and the value passed as a parameter to the AccessController.checkPermission( ) method. Alternatively, in other programming languages or systems, the authorization resource is a specific instruction, such as an operating system or supervisor call, or a set of specific method or procedure calls. Other languages may include, but are not limited to, C, C++ and C#.

Some authorization mechanisms are in effect over a bounded range of code within the program graph. In this case, the embodiment of the present invention provides means for locating a bounded path (240) includes locating a set of start nodes in the program graph, and locating a stop node in the program graph, where the bounded path includes all nodes within the graph bound by the start nodes and said stop node. In addition, the means for associating authorization resources with a bounded path (250) was previously described.

Figure 3:
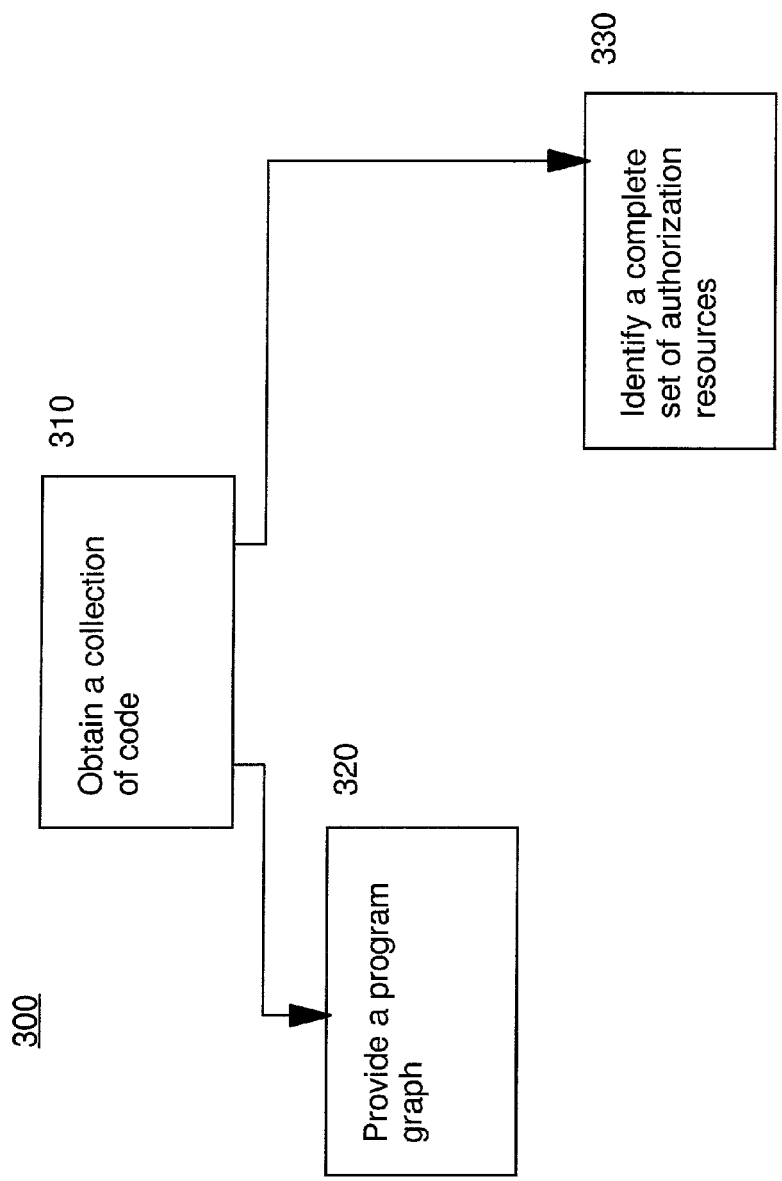
FIG. 3 shows an example of a method employing a computer which enables the identification of a complete set of authorization resources of the collection of code in accordance with the present invention.

In an example embodiment of the present invention, the invention includes a method employing a computer 300 which enables the identification of a complete set of authorization resources of the collection of code. As shown in FIG. 3, the method includes the steps of obtaining a collection of code (310), providing a program graph (320) representing the collection of code, and identifying a complete set of authorization resources (330) of the collection of code. If no authorization resources are identified in step (330), this indicates that authorization testing is not necessary for the collection of code. In the case of the runtime environment being Java, and when no other collections of code other than those identified in step (310) are running in the same runtime environment, then it may be possible for the runtime environment to run without a java.lang.SecurityManager installed, or to perform any other authorization tests during the execution of the collection of code.

It is noted that heretofore there was no method which was able to guarantee that it identified a complete set of authorization resources (330) of the collection of code. This is because existing program graph construction techniques did not scale well to large collections of code; and the analysis of non-type safe languages led to incomplete results due to the lack of precision in existing points-to analysis techniques. In addition, other existing type safe languages have not included security features that would require a search of authorization resources. It is very advantageous to identify the complete set of authorization resources of the collection of code in order to ensure that the correct set of authorization resources can be granted to the collection of code to allow it to execute. The alternative is that an insufficient set of authorizations are granted, thus prohibiting the program from executing; or too many authorizations are granted, resulting in possible security holes. Another reason for searching for the authorization resources is to identify possible resources which may be accessed, but to which a system administrator (e.g., a web browser user) would like to prohibit the collection of code from accessing.

Figure 4:
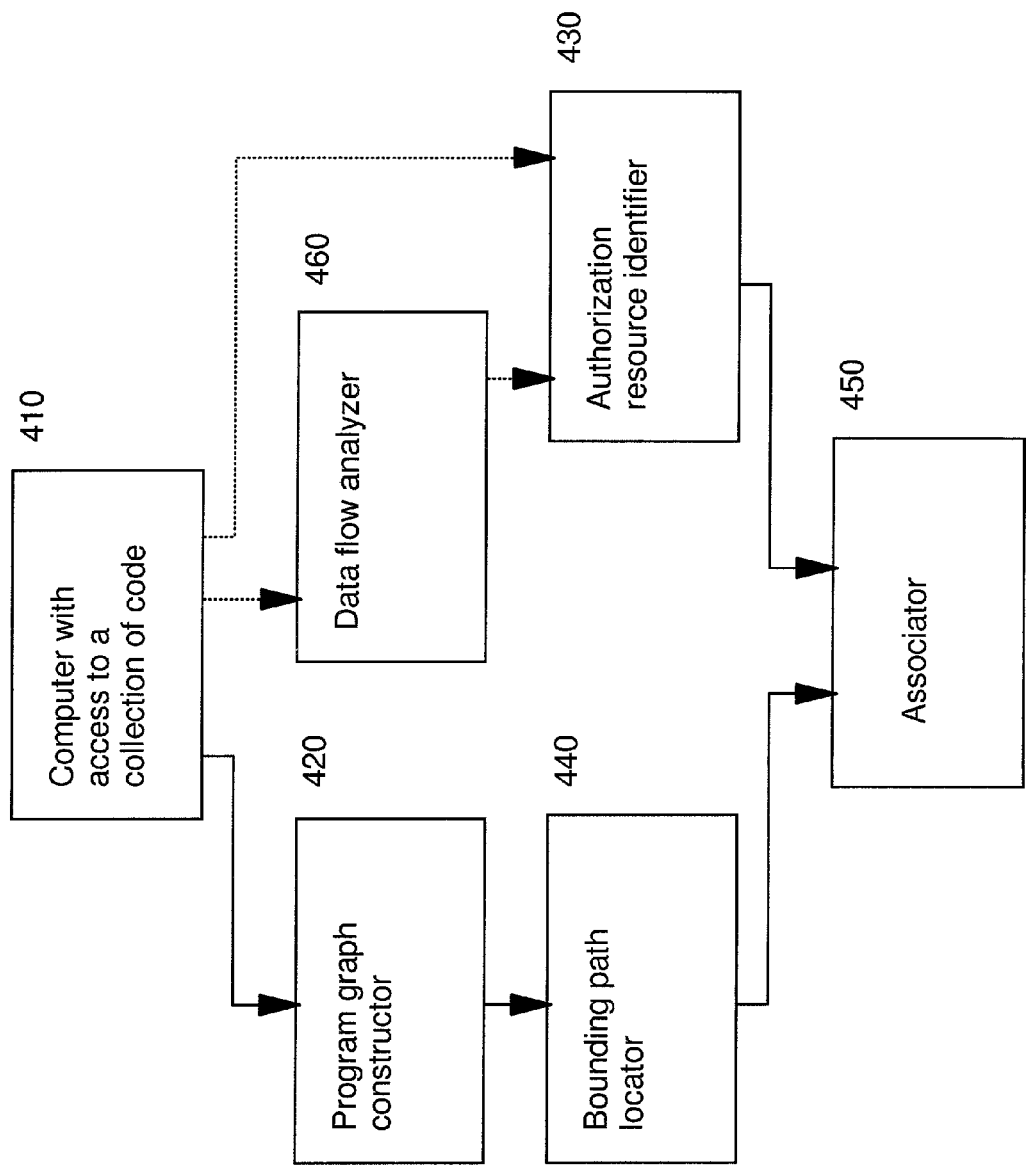
FIG. 4 shows an example of an embodiment of an apparatus for a computer providing the advantages of the present invention.

In still another example embodiment, the invention includes an apparatus for a computer providing the advantages of the present invention. As shown in FIG. 4, a computer (410) with access to a collection of code, includes an authorization resource identifier (430) to identify any authorization resources within the collection of code, a bounded path locator (440) to locate bounded paths within a program graph of the collection of code, and an associator (450) to associate any authorization resources with located bounded paths. The components of the apparatus are generally collocated. In alternate embodiments the components are not collocated but are coupled to communicate and act together to perform the function of the apparatus.

The collection of code generally includes codes obtained from a group of codes including basic blocks, class methods, classes, collections of classes or any combination of these. If a program graph exists for this collection of code, the program graph is acted upon by the bounding path locator. When a program graph does not exist, the collection of code is passed to a program graph constructor (420) which produces a program graph. It is advantageous for the program graph constructor (420) to employ static analysis techniques in producing the program graph. The static analysis can be performed on object code, source code, an intermediate representation of the program, such as is generated by a compiler, or any other suitable form of the code, or any suitable combination thereof.

As previously described, the authorization resource identifier (430) finds an authorization resource. If no authorization resources are identified, this indicates that authorization testing is not necessary for the collection of code. In the case of the runtime environment being Java, and when no other collections of code other than those identified by the computer (410) are running in the same runtime environment, then it may be possible for the runtime environment to run without a java.lang.SecurityManager installed, or to perform any other authorization tests during the execution of the collection of code. When the program is written in Java, the program graph is searched for one of the Java authorization points—a call to AccessController.checkPermission( ) or one of the authorization test methods in the java.lang.SecurityManager class. In the case of calling AccessController.checkPermission( ), the means for performing data flow analysis (460) will propagate an object which represents the authorization resource. In Java, this object is assignment compatible with java.security.Permission, and the value passed as a parameter to the AccessController.checkPermission( ) method. Alternatively, in other programming languages or systems, the authorization resource may be a specific instruction, such as an operating system or supervisor call, or a set of specific method or procedure calls. Other languages may include, but are not limited to, C, C++ and C#. In some cases, the identification step (430) employs a data flow (460). This data flow is often generated from the program graph.

Figure 5:
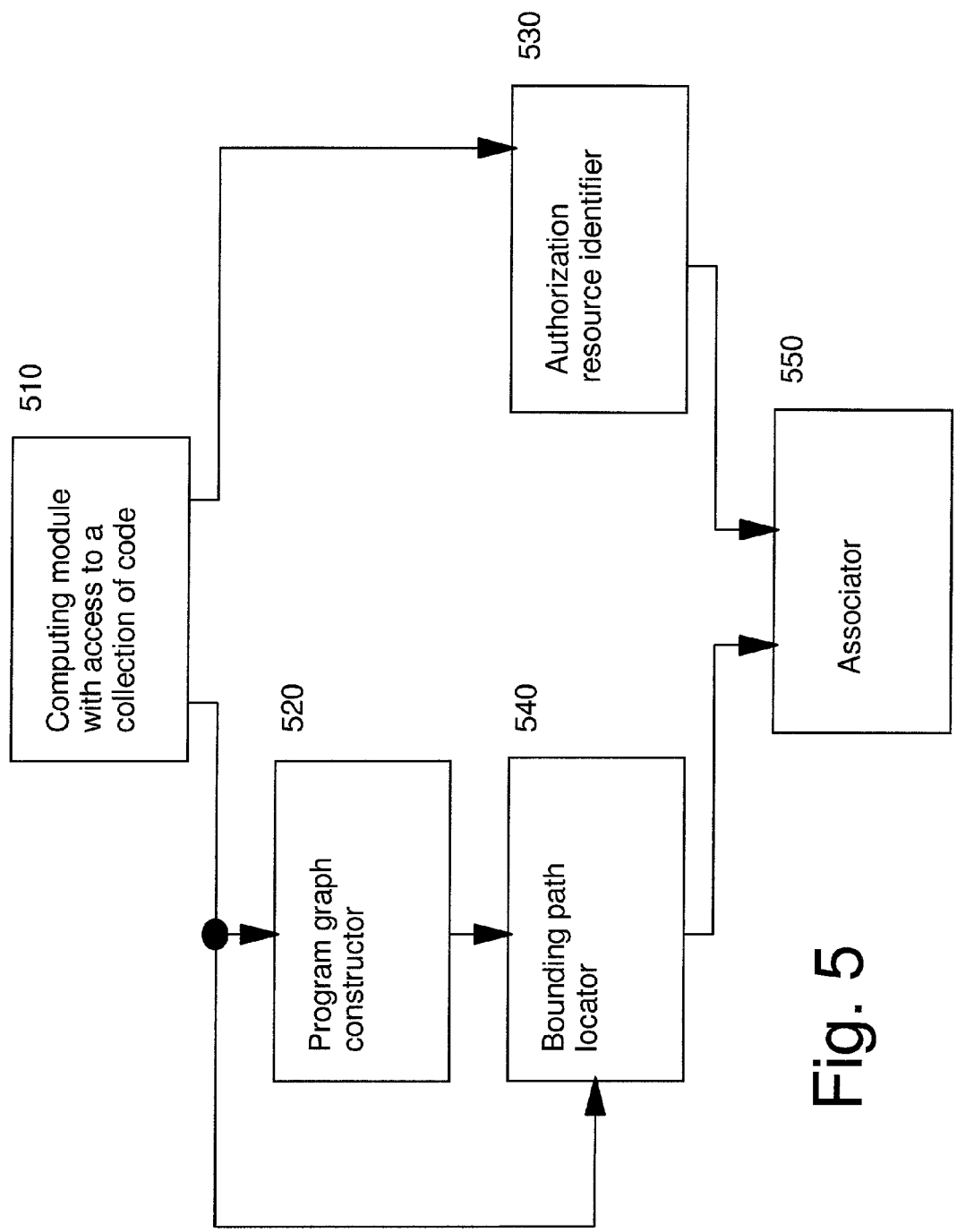
FIG. 5 shows another example embodiment of an apparatus for a computing module in accordance with the present invention.

In still another example embodiment of the present invention, the invention includes an apparatus for a computing module (510), shown in FIG. 5. The computing module (510) has access to a collection of code, and in some cases to a program graph for the collection of code. The computing module (510) includes: an authorization resource identifier (530) to identify any authorization resources within the collection of code; a program graph constructor (520) to construct a program graph when a program graph is not available; and a bounded path locator (540), to locate bounded paths within the program graph of the collection of code. If no authorization resource is identified by the authorization resource identifier (530), the identifier provides an indication that authorization testing is not necessary. It is advantageous for the program graph constructor (520) to use static analysis techniques to construct the program graph when a program graph is not available. The components of the computing module are generally collocated. In alternate embodiments the components are not collocated but are coupled to communicate and act together to perform the function of the apparatus.

Figure 6:
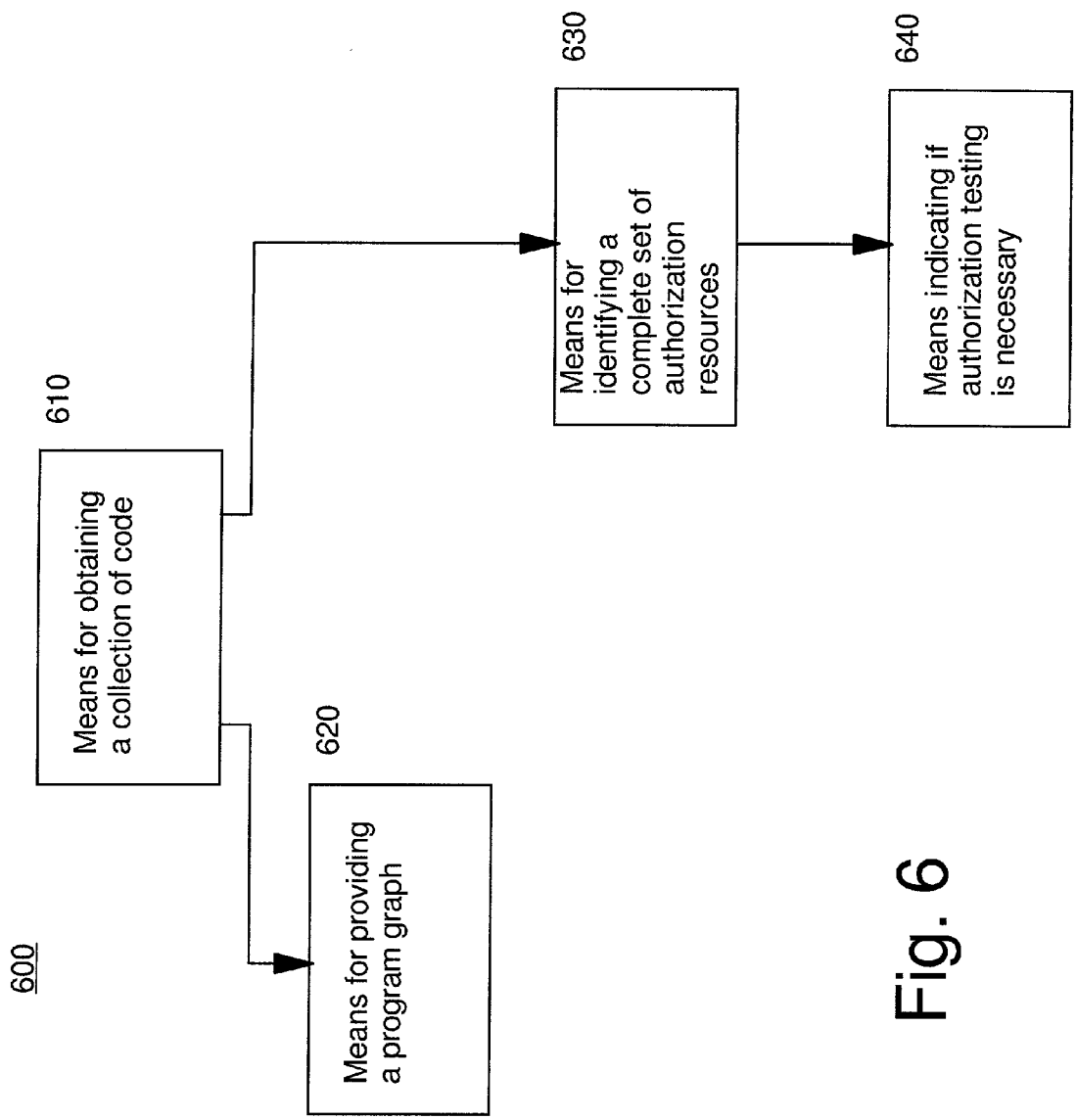
FIG. 6 shows an example of a flowchart of a method for identifying a complete set of authorization resources of a collection of code, in accordance with the present invention.

In another example embodiment of the present invention, the invention includes an apparatus for identifying a complete set of authorization resources of a collection of code, as is shown in FIG. 6. The apparatus includes computing means 600. The computing means includes: means for obtaining a collection of code (610); means for providing a program graph representing said collection of code (620); and means for identifying a complete set of authorization resources (630) of the collection of code. In some cases there is also means for indicating whether authorization testing is or is not necessary (640). If no resource is identified in step (630), this is an indication that authorization testing is not necessary.

Figure 7:
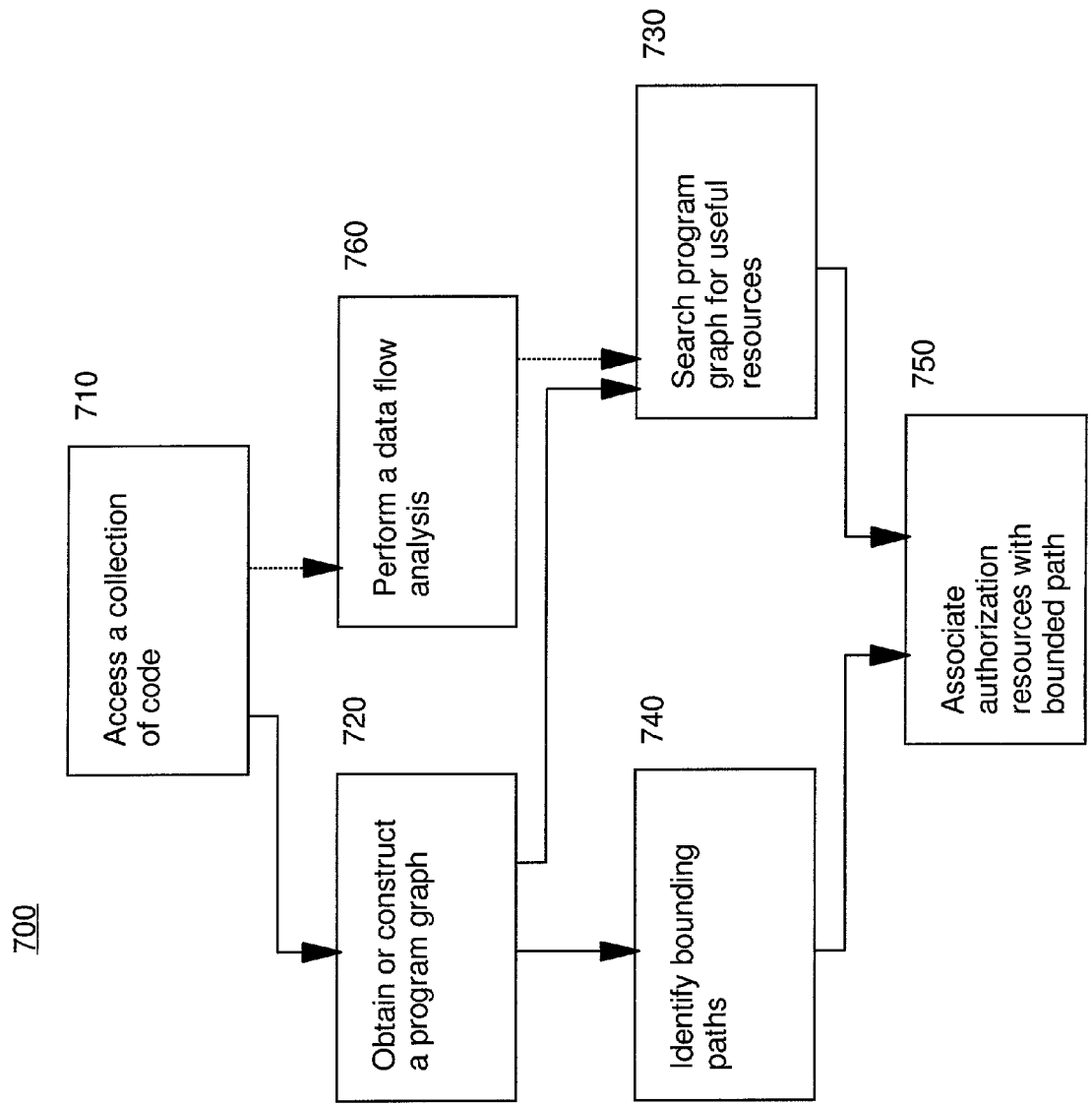
FIG. 7 shows another example of an embodiment of a method employing a computer with access to a collection of code in accordance with the present invention.

In a further example embodiment of the present invention, the invention includes a method employing a computer with access to a collection of code (710), shown in FIG. 7. The method includes the steps of obtaining or constructing a program graph (720) from the collection of code [using static analysis techniques]; performing a data flow analysis (760) [using static analysis techniques]; searching the program graph for useful resource (730) for executing the collection of code; identifying any bounded paths (740) within the program graph over which the useful resource is beneficial; and associating the useful resource (750) with the collection of code. When used, the static analyses can be performed on object code, source code, an intermediate representation of the program, such as is generated by a compiler, or any other suitable form of the code, or any suitable combination thereof. The program graph can be a call graph, an invocation graph, and/or any other suitable graph as is known to those skilled in the art. The program graph can be context sensitive, which may include type information for any method receiver and/or any of the parameters. As is known to those skilled in the art, the type information may be further refined to include class and memory allocation site information and/or any other differentiator which would further refine the labeling of the type, including per instance information. The collection of code includes codes constructed from a group of codes including basic blocks, class methods, classes, collections of classes or any combination of these.

In some embodiments, the step of searching (730) includes locating a node or edge in the program graph (720) that represents a location where the useful resource (730) would be beneficial. This location may be an authorization test.

In further embodiments, the program graph (720) represents an object oriented program, such as a program written in the Java programming language. The program graph (720) and data flow analysis (760) are obtained from Java object code. The useful resource identified in step (730) may be a resource identifier, such as a java.security.Permission object or an object that is assignment compatible. The authorization test may be a call to any
java.security.AccessController.checkPermission method or any authorization testing method in an instance of
java.lang.SecurityManager and/or one of its subclasses. One of these authorization tests may accept, as a parameter, a
java.security.Permission object or an object that is assignment compatible. Through the use of the program graph and data flow analysis, the constructor of the
java.security.Permission object (or subclass) is located, and the data flow analysis is used to identifying any value passed by as a parameter to the constructor, where the combination of the Java
java.security.Permission and a value for any parameter used permission for the authorization test.

In addition, the step of identifying bounded paths (740) often includes locating a set of start nodes in the program graph, and locating a stop node in the program graph, and the bounded paths include all nodes within the program graph bound by the start nodes and stop node.

In addition, in the step of associating (750), the useful resource is sometimes mapped using any number of techniques known to those skilled in the art. This mapping may include the use of hash tables that use an element of the collection of code as the key and a value that holds a collection of java.security.Permission objects. Thus it is possible to use a subset of the collection of code to the identified useful resource used by that subset of the collection of code. This subset may include the nodes in the bounded path.

In an example embodiment of the case of code written to use the reference implementation of the Java runtime environment, the stop node represents the method
java.security.AccessController.checkPermission( ), and the start nodes are any of root nodes in the program graph or a node representing the method
java.security.AccessController.doPrivileged( ).
In this case, a
java.security.Permission object, or an object that is assignment compatible, is associated with the code associated with the bounded path. In addition, the same
java.security.Permission object, or an object that is assignment compatible, is associated with the code associated with any node in the program graph prior to the
java.security.AccessController.doPrivileged( ) node. Also, a
java.security.Permission object, or an object that is assignment compatible, is associated with each
java.security.AccessController.checkPermission( ) in the program graph.

As previously described, after Permission objects are associated with nodes in the program graph, generally, the Permissions are then associated with method that is represented by with the node in the program graph. As previously described, all Permissions associated with each method are also associated with their respective declaring classes. As previously described, if the collection of code (710) is a set of classes, then the Permissions associated with the classes in the set also are associated with the set of classes. That is, the Permissions are aggregated from the smaller collections of code to the larger collections of code. It is advantageous that during the execution of the collection of code (710), the useful resources identified in the present invention is employed when executing the collection of code.

Figure 8:
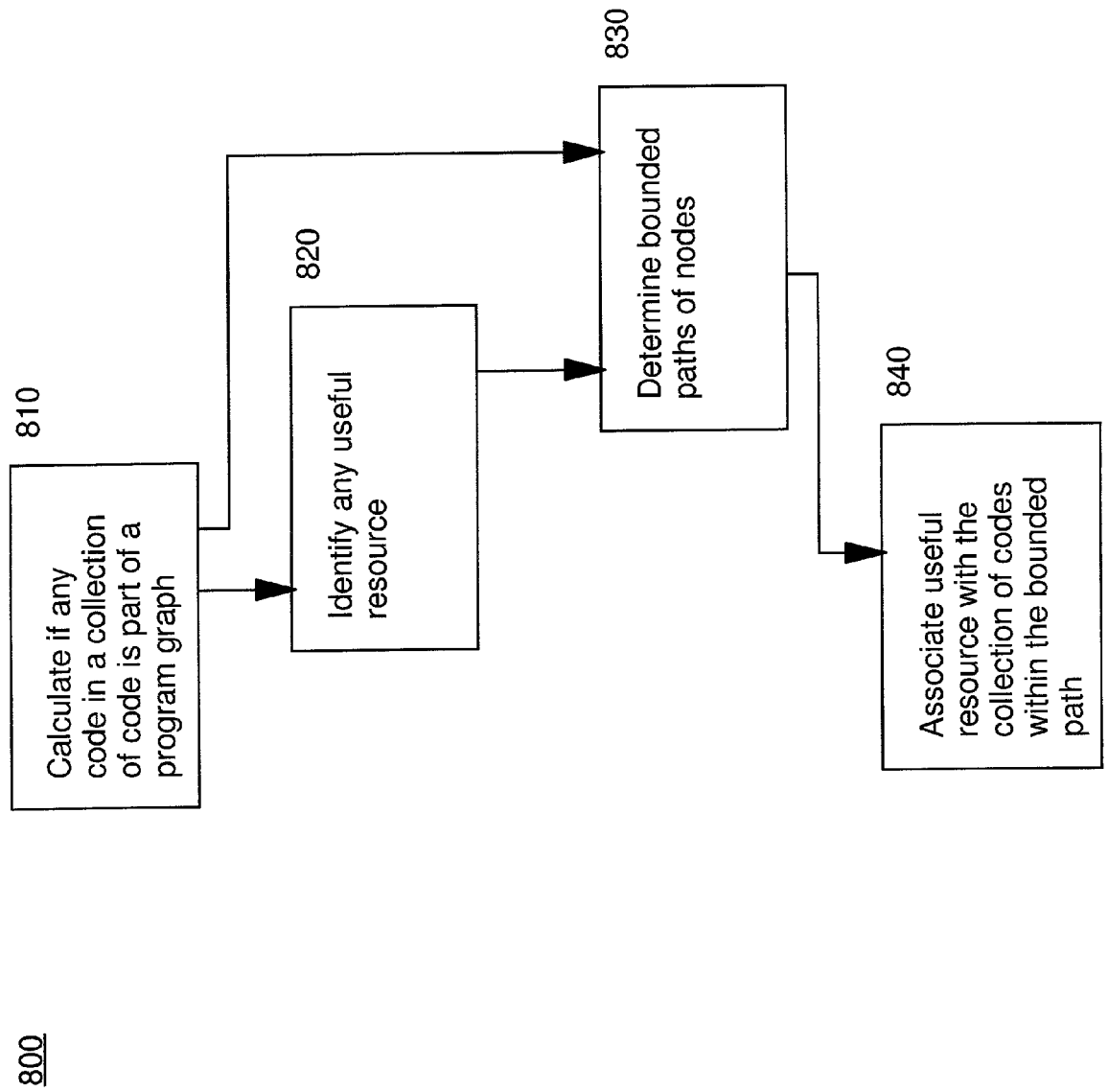
FIG. 8 shows another example of an embodiment of a method employing a computer with access to a collection of code; in accordance with the present invention In an example embodiment of the present invention, the invention includes an apparatus for a computing means.

In still a further example embodiment of the present invention, the invention includes a method for statically detecting useful resources for a collection of code 800, shown in FIG. 8. The code is written in a computer programming language. As shown in FIG. 8, the method includes the steps of: calculating if any code in a collection of code is part of a program graph (810); identifying any useful resource (820) in the collection of code; determining bounded paths of nodes within the program graph which constrain the useful resources (830) of the collection of code; and associating the useful resource with the collection of code within the bounded path (840) of nodes in the program graph.

In useful embodiments of the present invention, the program graph can be a call graph, an invocation graph, and/or other suitable graph known to those skilled in the art, which have a set of root nodes. From the program graph it is possible to determine whether a basic block, method, class is represented as a node in the graph. By using the program graph, it is possible to identify used resources. The bounded nodes are all nodes in the graph that are bounded between start nodes and a stop nodes, and all nodes in between the start nodes and the stop node. The start nodes may include the program graph root nodes.

Thus in particular embodiments of a method statically detecting useful resources for a collection of code: the step of calculating includes using said program graph is an invocation graph includes having a set of root nodes for said program graph; and/or the step of calculating includes using a call graph having a set of root nodes for said program graph; and/or the method includes: a step of determining whether a basic block, method, class is represented as a node in said invocation graph; a step determining whether a basic block, method, class is represented as a node in said call graph; and/or a step identifying a node in said invocation graph that identifies said useful resources, wherein said useful resources is one or more resources; and/or a step identifying a node in said invocation graph that identifies said useful resources, wherein said useful said resources is one or more resources; and/or the nodes in said bounded path of nodes bounded nodes are all nodes in the graph that are bounded between start nodes and a stop node; and/or the nodes in the bounded path of nodes are all nodes in the graph that are bounded between a set of start nodes and a stop node; and/or some or all root nodes in said invocation graph are members of the start nodes.

It is noted that the present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein. The present invention can also be embedded in a computer program product, which includes all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after either or both of the following a) conversion to another language, code or notation; b) reproduction in a different material form.

It is noted that the foregoing has outlined some of the more pertinent objects and embodiments of the present invention. This invention may be used for many applications, such as gathering of information to determine authorizations used by collections of code. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The invention claimed is:

1. A method comprising:
employing a computer for;
obtaining a collection of code;
providing a program graph representing said collection of code;
identifying any authorization resources of said collection of code;
locating any bounded path within said program graph; and
associating said any authorization resource with said any bounded path; and
employing privileged code wherein a stop node represents a check permission method and start nodes are any of root nodes in said program graph or a node representing a privileged action method.

2. A method as recited in claim 1, wherein said collection of code includes codes obtained from a group of codes including basic blocks, class methods, classes, collections of classes or any combination of these.

3. A method as recited in claim 1, wherein the step of providing includes constructing said program graph through static analysis techniques.

4. A method as recited in claim 3, wherein the step of constructing includes employing object code.

5. A method as recited in claim 1, wherein the step of identifying includes finding at least one authorization point in said program graph.

6. A method as recited in claim 5, wherein the step of finding the authorization point includes finding a permission node in said program graph, and finding a permission object passed as an argument to a check permission method.

7. A method as recited in claim 5, wherein said authorization point is an instruction invocation.

8. A method as recited in claim 7, wherein said instruction invocation is used in a particular language for said collection of code.

9. A method as recited in claim 8, wherein said particular language is C#.

10. A method as recited in claim 1, wherein the step of identifying includes employing data flow analysis.

11. A method as recited in claim 10, wherein the step of employing includes generating a data flow from said program graph.

12. A method as recited in claim 1, wherein the step of identifying any bounded path includes locating a set of start nodes in said program graph, and locating the stop node in said program graph; and said bounded path includes all nodes within the graph bound by said start nodes and said stop node.

13. A method as recited in claim 1, wherein the step of associating includes associating and aggregating said any authorization resource with said collection of code.

14. An apparatus comprising:
computing means having:
means for obtaining a collection of code;
means for providing a program graph representing said collection of code;
means for identifying any authorization resources of said collection of code;
means for locating any bounded path within said program graph;
means for associating said any authorization resource with said any bounded path; and means for employing privileged code wherein a stop node represents a check permission method and start nodes are any of root nodes in said program graph of a node representing a privileged action method.

15. An apparatus as recited in claim 14, wherein said collection of code includes codes obtained from a group of codes including basic blocks, class methods, classes, collections of classes or any combination of these.

16. An apparatus as recited in claim 14, wherein the means for providing includes means for constructing said program graph through static analysis techniques.

17. An apparatus as recited in claim 16, wherein the means for constructing includes employing object code.

18. An apparatus as recited in claim 14, wherein the means for identifying includes means for finding at least one authorization point in said program graph.

19. An apparatus as recited in claim 18, wherein the means for finding the authorization point includes finding a permission node in said program graph, and finding a permission object opassed as an argument to a check permission method.

20. An apparatus as recited in claim 18, wherein said authorization point is an instruction invocation.

21. An apparatus as recited in claim 20, wherein said instruction invocation is used in a particular language for said collection of code.

22. An apparatus as recited in claim 21, wherein said particular language is C#.

23. An apparatus as recited in claim 14, wherein the means for identifying includes employing data flow analysis.

24. An apparatus as recited in claim 23, wherein the means for employing includes generating a data flow from said program graph.

25. An apparatus as recited in claim 14, wherein the means for identifying any bounded path includes locating a set of start nodes in said program graph, and locating the stop node in said program graph; and said bounded path includes all nodes within the graph bound by said start nodes and said stop node.

26. An apparatus as recited in claim 14, wherein the means for associating includes associating and aggregating said any authorization resource with said collection of code.

27. A method comprising:
employing a computer including the steps of:
obtaining a collection of code;
providing a program graph representing said collection of code;
identifying a complete set of authorization resources of said collection of code;
identifying any bounded path within said program graph;
associating any authorization resource with said any bounded path; and
employing privileged code wherein a stop node represents a check permission method and start nodes are any of root nodes in said program graph or a node representing a privileged action method.

28. A method as recited in claim 27, if no resource is identified in said step of identifying, further comprising providing an indication that authorization testing is not necessary.

29. An apparatus comprising:
a computer having access to a collection of code, the computer including:
an authorization resource identifier to identify any authorization resources within the collection of code;
a bounded path locator to locate any bounded path within a program graph of said collection of code; and
an associator to associate said any authorization resource with said any bounded path; and
wherein the bounded path locator is configured to employ privileged code wherein a stop node represents a check permission method and start nodes are any of root nodes in said program graph or a node representing a privileged action method.

30. An apparatus as recited in claim 29, wherein said collection of code includes codes obtained from a group of codes including basic blocks, class methods, classes, collections of classes or any combination of these.

31. An apparatus as recited in claim 29, further comprising a program graph constructor to construct said program graph through static analysis techniques.

32. An apparatus as recited in claim 29, wherein the program graph constructor uses object code of said collection of code.

33. An apparatus as recited in claim 29, wherein the authorization resource identifier finds at least one authorization point in said program graph.

34. An apparatus as recited in claim 33, wherein the authorization point includes finding a permission node in said program graph, and finding a permission object passed as an argument to a check permission method.

35. An apparatus as recited in claim 33, wherein said authorization point is an instruction invocation.

36. An apparatus as recited in claim 35, wherein said instruction invocation is used in a particular language for said collection of code.

37. An apparatus as recited in claim 36, wherein said particular language is C#.

38. An apparatus as recited in claim 29, wherein the authorization resource identifier employs data flow analysis.

39. An apparatus as recited in claim 38, wherein the data flow analysis is generated from said program graph.

40. An apparatus comprising:
a computing module having access to a collection of code, the computer module including:
an authorization resource identifier to completely identify any authorization resources within a collection of code; and
a bounded path locator to locate any bounded path within a program graph of said collection of code; and
wherein the bounded path locator is configure to employ privileged code wherein a stop node represents a check permission method and start nodes are any of root nodes in said program graph or a node representing a privileged action method.

41. An apparatus as recited in claim 40, wherein the authorization resource identifier provides an indication that authorization testing is not necessary if no resource is identified by said authorization resource identifier.

42. An apparatus as recited in claim 40, further comprising an associator to associate said any authorization resource with said any bounded path.

43. An apparatus comprising:
a computer including:
means for obtaining a collection of code;
means for providing a program graph representing said collection of code;
means for identifying a complete set of authorization resources of said collection of code;
means for identiyuing any bounded path within said program graph;

means for associating any authorization resource with said any bounded path; and means for employing privileged code wherein a stop node represents a check permission method and start nodes are any of root nodes in said program graph or a node representing a privileged action method.

44. An apparatus as recited in claim 43, further comprising means for indicating if authorization testing is necessary.

45. A method comprising:
employing a computer for:
constructing a program graph from a collection of code using static analysis techniques;
performing a data flow analysis using static analysis techniques;
searching said program graph for any useful resource for executing said collection of code;
identifying any bounded path within said program graph over which said resource is utilized;
associating said resource with said collection of code;
wherein the step of association includes mapping a subset of said collection of code to said resource;
wherein the subset of said collection of code includes nodes in said bounded path; and
employing privileged code wherein a stop node represents a check permission method and start nodes are any of root nodes in said program graph or a node representing a privileged action method.

46. The method as recited in claim 45, wherein the step of constructing includes employing source code of said collection of code.

47. A method as recited in claim 45, wherein the step of constructing includes building an invocation graph of said collection of code to form said program graph.

48. A method as recited in claim 45, wherein the step of constructing a program graph includes constructing a call graph of said collection of code to form said program graph.

49. A method as recited in claim 45, wherein said step of constructing includes using context-sensitivity.

50. A method as recited in claim 49, wherein said step of using context sensitivity includes using type information for any method receiver and/or any parameter.

51. A method as recited in claim 50, wherein the step of using type information includes using class and memory allocation site information.

52. A method as recited in claim 51, wherein the step of using type information includes using per instance information.

53. A method as recited in claim 52, wherein the step of using instance information includes associating instance information with a node or edge in said program graph.

54. A method as recited in claim 45, wherein said collection of code includes codes constructed from a group of codes including basic blocks, class methods, classes, collections of classes or any combination of these.

55. A method as recited in claim 45, wherein the step of searching includes locating a node or edge in said program graph that represents a location where said resource would be utilized.

56. A method as recited in claim 55, wherein said resource is a resource identifier.

57. A method as recited in claim 55, wherein said location is an authorization test.

58. A method as recited in claim 45, wherein said program graph represents an object oriented program.

59. A method as recited in claim 45, wherein said program graph and said data flow analysis are constructed from object code.

60. A method as recited in claim 56, wherein said resource identifier includes at least one permission class.

61. A method as recited in claim 57, wherein said authorization test is a call to any check permission method.

62. A method as recited in claim 57, wherein said location represents a call to any authorization testing method in any instance of a security manager class and/or one of its subclasses.

63. A method as recited in claim 50, wherein said node has a parameter which said type information is a permission class.

64. A method as recited in claim 63, wherein the step of identifying includes locating the constructor for said permission class allocation site and using said data flow analysis in identifying any value passed by any parameter to said constructor, wherein the combination of the permission class and a value for any parameter is the used permission object.

65. A method as recited in claim 45, wherein the step of identifying any bounded path includes locating a set of start nodes in said program graph, and locating the stop node in said program graph; and said bounded path includes all nodes within the graph bound by said start nodes and said stop node.

66. A method as recited in claim 45, further comprising connecting a used permission object with said privileged code.

67. A method as recited in claim 66, further comprising connecting a used permission object with any node in said program graph prior to a privileged action node.

68. A method as recited in claim 66, wherein said step of associating includes connecting a used permission object for each check permission method in said program graph.

69. A method as recited in claim 68, wherein said step of associating includes connecting said used permission object from each node in said program graph to each method associated with said program graph.

70. A method as recited in claim 69, wherein said step of associating includes connecting said used permission object from each method in said program graph to each class in said program graph.

71. A method as recited in claim 70, wherein said step of associating includes connecting said used permission object from each class in said program graph to a collection of classes.

72. A method as recited in claim 71, wherein said step of associating includes connecting said used permission object includes associating each class in said program graph to a collection of classes.

73. A method as recited in claim 45, further comprising employing said resource in executing said collection of code.

74. A method comprising:
statically detecting resources for a collection of code written in a computer programming language, by including the steps of:
calculating if any code of said collection of code is part of a program graph;
identifying any resource for said collection of code;
determining any bounded path of nodes within said program graph which constrain said resources of said collection of code;
associating said resource with said collection of code within said bounded path of nodes in said program graph; and
employing privileged code wherein a stop node represents a check permission method and start nodes are any of root nodes in said program graph or a node representing a privileged action method.

75. A method as recited in claim 74, wherein the step of calculating includes using an invocation graph having a set of root nodes for said program graph.

76. A method as recited in claim 74, wherein the step of calculating includes using a call graph having a set of root nodes for said program graph.

77. A method as recited in claim 75, further comprising determining whether a basic block, method, class is represented as a node in said invocation graph.

78. A method as recited in claim 76, further comprising determining whether a basic block, method, class is represented as a node in said call graph.

79. A method as recited in claim 75, further comprising identifying a node in said invocation graph that identifies said useful resources, wherein said useful resources is one or more resources.

80. A method as recited in claim 76, further comprising a step identifying a node in said invocation graph that identifies said useful resources, wherein said useful resources is one or more resources.

81. A method as recited in claim 75, wherein nodes in said bounded path of nodes are all nodes in the graph that are bounded between start nodes and the stop node.

82. A method as recited in claim 76, wherein nodes in said bounded path of nodes are all nodes in the graph that are bounded between a set of start nodes and the stop node.

83. A method as recited in claim 82, wherein all root nodes in said invocation graph are members of the start nodes.

84. An article of manufacture comprising a computer usable medium having computer readable program code means embodied therein for causing association, the computer readable program code means in said article of manufacture comprising computer readable program code means for causing a computer to effect the steps of claim 1.

85. An article of manufacture comprising a computer usable medium having computer readable program code means embodied therein for causing identification, the computer readable program code means in said article of manufacture comprising computer readable program code means for causing a computer to effect the steps of claim 27.

86. An article of manufacture comprising a computer usable medium having computer readable program code means embodied therein for causing association, the computer readable program code means in said article of manufacture comprising computer readable program code means for causing a computer to effect the steps of claim 45.

87. An article of manufacture comprising a computer usable medium having computer readable program code means embodied therein for causing statistical detection, the computer readable program code means in said article of manufacture comprising computer readable program code means for causing a computer to effect the steps of claim 75.

88. A computer program product comprising a computer usable medium having computer readable program code means embodied therein for causing association, the computer readable program code means in said computer program product comprising computer readable program code means for causing a computer to effect the functions of the elements in claim 14.

89. A computer program product comprising a computer usable medium having computer readable program code means embodied therein for causing association, the computer readable program code means in said computer program product comprising computer readable program code means for causing a computer to effect the functions of the elements in claim 29.

90. A computer program product comprising a computer usable medium having computer readable program code means embodied therein for causing identification, the computer readable program code means in said computer program product comprising computer readable program code means for causing a computer to effect the functions of the elements in claim 40.

91. A computer program product comprising a computer usable medium having computer readable program code means embodied therein for causing identification, the computer readable program code means in said computer program product comprising computer readable program code means for causing a computer to effect the functions of the elements in claim 43.

92. A program storage device readable by machine, tangibly embodying a program of instructions executable by the machine to perform method steps for identification, said method steps comprising the steps of claim 1.

* * * * *

UNITED STATES PATENT AND TRADEMARK OFFICE
CERTIFICATE OF CORRECTION

| | |
|---|---|
| PATENT NO. | : 7,076,804 B2 |
| APPLICATION NO. | : 09/854031 |
| DATED | : July 11, 2006 |
| INVENTOR(S) | : Aaron Kershenbaum et al. |

It is certified that error appears in the above-identified patent and that said Letters Patent is hereby corrected as shown below:

Column 19, Line 15, Claim 45, "useful" should be deleted.

Column 21, Line 17, Claim 79, both instances of "useful" should be deleted.

Column 21, Line 21, Claim 80, both instances of "useful" should be deleted.

Signed and Sealed this

Twentieth Day of March, 2007

JON W. DUDAS
*Director of the United States Patent and Trademark Office*